United States Patent [19]
Thompson

[11] 3,793,209
[45] Feb. 19, 1974

[54] ORGANIC DEPOSIT AND CALCIUM SULFATE SCALE REMOVAL EMULSION AND PROCESS

[75] Inventor: James L. Thompson, Tulsa, Okla.
[73] Assignee: The Dow Chemical Company, Midland, Mich.
[22] Filed: Aug. 9, 1971
[21] Appl. No.: 170,373

[52] U.S. Cl......... 252/87, 252/8.55 B, 252/8.55 C, 252/82, 252/143
[51] Int. Cl.............................................. C02b 5/06
[58] Field of Search...... 252/87, 82, 8.55 B, 8.55 C, 252/143

[56] References Cited
UNITED STATES PATENTS

| | | | |
|---|---|---|---|
| 2,135,909 | 11/1938 | Monson | 252/855 B |
| 2,681,889 | 6/1954 | Manual et al. | 252/8.55 C |
| 2,689,009 | 9/1954 | Brainard et al. | 252/8.55 C |
| 2,910,436 | 10/1959 | Fatt et al. | 252/8.55 C |
| 3,402,770 | 9/1968 | Messenger | 252/8.55 B |
| 3,639,279 | 2/1972 | Gardner et al. | 252/8.55 B |
| 3,661,785 | 4/1972 | De Pierri | 252/8.55 B |
| 2,886,477 | 5/1959 | Smith | 252/143 |

FOREIGN PATENTS OR APPLICATIONS 1,202,081   8/1970   Great Britain ................ 252/8.55 C

OTHER PUBLICATIONS

Morris, "Chemical Clean-Out of Oil Wells in California," The Oil Weekly, April 19, 1937, pp. 23–34.

*Primary Examiner*—Norman G. Torchin
*Assistant Examiner*—John R. Miller
*Attorney, Agent, or Firm*—Bruce M. Kanuch

[57] ABSTRACT

An emulsion which is successful for removing calcium sulfate deposits which are coated and/or commingled with an organic deposit is disclosed and claimed. The emulsion comprises a continuous aqueous phase of at least one of sodium citrate, a water soluble salt of ethylenediaminetetraacetic acid, or potassium glycolate, having dispersed therein an aromatic solvent and, as an emulsifier, an acid phosphate ester.

5 Claims, No Drawings

3,793,209

ORGANIC DEPOSIT AND CALCIUM SULFATE SCALE REMOVAL EMULSION AND PROCESS

BACKGROUND OF THE INVENTION

It is often desired to solubilize various materials with an effective solvent solution. For example, various aqueous solutions are employed to solubilize calcium sulfate scales from a subterranean formation, pipe line casing located in a borehole, tubing, processing equipment and the like.

In many instances the calcium sulfate scales have become coated and/or commingled with solid or semisolid organic material which cannot be readily removed by the scale solvent. For example, in oil and gas production wells and petroleum processing equipment, calcium sulfate scale deposits become coated with various organic deposits such as oils, asphaltenes, paraffins, tars, greases, and the like. To obtain the full production capacity of wells and the like, it is necessary to remove these deposits. One method presently employed is to alternatively treat the coated surfaces with an aromatic solvent for said organic deposits and another solvent for the scales. These multistage treatments are costly, time consuming and sometimes ineffective. Also, in many cases several solvent and acid treatments are necessary because the organic materials and scale are deposited in alternate layers.

The present invention concerns a composition and method for removing calcium sulfate scales occluded with organic materials in a one-stage treatment.

SUMMARY OF THE INVENTION

The present invention comprises an emulsion which is useful for removing calcium sulfate scales deposited on various surfaces wherein the scale is occluded with organic materials.

It is useful in such applications as removing calcium sulfate deposits from producing wells, injection or disposal wells, heater treaters, flow lines, tubing, formation surfaces, in water flooding and the like.

The emulsion comprises as the continuous phase an aqueous dispersion of a calcium sulfate scale solvent and as the dispersed phase an aromatic solvent for organic materials. The emulsion is stabilized with an acid phosphate ester derived from an ethoxylated intermediate weight alcohol.

Scales having occluded organic materials (e.g., coatings and/or intermediate coatings) are treated with the emulsion to effectively remove both the scale and the organic material.

DETAILED DESCRIPTION OF THE INVENTION

The scale remover solvent comprises any of the well-known chelation calcium sulfate scale removal chemicals or other solvents which are dispersible in an aqueous solution. They include, for example, ethylenediaminetetraacetic acid salts, e.g., tetrasodium ethylenediaminetetraacetate, sodium citrate (e.g. the dihydrate), potassium glycolate or the like.

Any aromatic solvent which is effective to remove the organic materials encountered can be used. Toluene, both crude and refined, benzene, xylene, and the like are effective.

The emulsion can be prepared having an aqueous phase to aromatic phase volume proportion ranging from about 80:20 to about 50:50.

The emulsifier is employed in an amount which is effective to provide an emulsion which is stable for a period of time which is sufficient to treat the scale. In field use, i.e., treatment of gas, oil and other wells and equipment, water flooding, etc., an emulsion which has less than about 20 percent breakout of the aromatic phase in 24 hours at a temperature of about 75°F is considered to be stable. The emulsion of the present invention is found to have less than 20 percent breakout of the aromatic solvent at a temperature as high as 120°F after 48 hours.

Generally, the emulsifier is employed in an amount ranging from about 5 to about 50 gallons per 1000 gallons of the emulsion. Phosphate ester emulsifiers found preferable comprise at least one of a phosphate ester of an ethoxylated straight chain alcohol (8–10 carbon atoms) containing 4 moles of ethylene oxide, or a phosphate ester of ethoxylated tridecyl alcohol containing 6 moles of ethylene oxide.

The emulsion may be prepared in the following manner: The aqueous solution containing a desired concentration of scale solvent is slowly added to a mixture of an aromatic solvent and the emulsifier with continuous agitation. Initially an aqueous solution-in-oil emulsion will be formed. Upon the addition of greater amounts of the aqueous solution, the emulsion will invert to form a stable aromatic solvent in a continuous aqueous phase emulsion.

EXAMPLE

An oil well producing about 2 barrels of oil per day was substantially blocked because of calcium sulfate deposits. The well was treated with 1000 gallons of an emulsion composition having the following constituents: An eighty per cent by volume of a scale solvent containing 38 percent by weight of active tetra sodium ethylene diaminetetraacetate; 19 percent by volume of toluene as the aromatic solvent and 1 percent by volume of an emulsifier comprising a biodegradable acid phosphate ester derived from an ethoxylated intermediate weight alcohol purchased under the trade name Wayfos CD from Philip A. Hunt Chemical Corporation.

The well was treated with the emulsion in the following manner: 84 Barrels of the emulsion were pumped down the annulus of the well to a depth of about 4340 feet. The pump was stopped and the emulsion allowed to soak in the well for about 2 hours. Following this, 5 more barrels of the emulsion were pumped followed by another 2-hour soaking period. The 5 barrel treatment was repeated 3 more times and followed by a final 5 barrels and the well was shut in for 24 hours. After the treating fluids were removed, the well produced 50 barrels of oil per day.

What is claimed is:

1. An emulsion composition which comprises:
    a. as the continuous phase an aqueous solution of a calcium sulfate scale solvent selected from the group consisting of an ethylenediaminetetraacetic acid salt, sodium citrate or potassium glycolate;
    b. as the dispersed phase a liquid aromatic solvent for solid or semisolid organic materials, the volume proportion of said aqueous phase to said aromatic phase ranging from about 80:20 to about 50:50; and
    c. an effective amount of an emulsifier consisting of at least one of a phosphate ester of an ethoxylated straight chain alcohol containing 8 to 10 carbon atoms and containing 4 moles of ethylene oxide, or a phosphate ester of an ethoxylated tridecyl alcohol containing 6 moles of ethylene oxide.

2. The composition of claim 1 wherein the volume proportion of the aqueous phase to aromatic solvent phase ranges from about 80:20 to about 50:50.

3. The composition of claim 1 wherein the scale solvent is tetrasodium ethylenediaminetetraacetate.

4. The composition of claim 4 wherein the aromatic solvent is toluene.

5. A method of dissolving calcium sulfate scales occluded with organic materials which comprises:
 a. contacting said scales with an emulsion comprising as the continuous phase an aqueous solution of a calcium sulfate scale solvent selected from the group consisting of an ethylenediaminetetraacetic acid salt, sodium citrate, or potassium glycolate, as the dispersed phase an aromatic solvent for said organic material, said volume proportion of said aqueous phase to said aromatic phase ranging from about 80:20 to about 50:50, and an effective amount of an emulsifier consisting of at least one of a phosphate ester of an ethoxylated straight chain alcohol containing 8 to 10 carbon atoms and containing 4 moles of ethylene oxide, or a phosphate ester of an ethoxylated tridecyl alcohol containing 6 moles of ethylene oxide.

* * * * *

PO-1050
(5/69)

UNITED STATES PATENT OFFICE
CERTIFICATE OF CORRECTION

Patent No. 3,793,209          Dated 2/19/74

Inventor(s) J.L. Thompson

It is certified that error appears in the above-identified patent and that said Letters Patent are hereby corrected as shown below:

In column 3, line 10, after "claim" delete "4" and insert --3--.

Signed and sealed this 24th day of September 1974.

(SEAL)
Attest:

McCOY M. GIBSON JR.
Attesting Officer

C. MARSHALL DANN
Commissioner of Patents